3,298,897
PRODUCTION OF REINFORCED METAL SALT PRODUCT
Richard F. Shannon, Lancaster, Ohio, assignor to Owens-Corning Fiberglas Corporation, a corporation of Delaware
No Drawing. Filed Jan. 29, 1963, Ser. No. 254,586
6 Claims. (Cl. 161—170)

This invention relates to the production of a reinforced metal salt product, and, more particularly, to a method including containment of a molten fusible metal salt in close association with vitreous reinforcing bodies during solidification of the molten salt to a continuous solid mass of sub-microscopic crystals, and to products produced by the process.

The method of the invention provides products which are suitable for high temperature applications. As a gasket in high temperature service, a plastic fusible metal salt component of the product yields sufficiently under stress to enable accomplishment of a tight seal while the vitreous reinforcing bodies in the product control the yielding and limit plastic deformation to such an extent that the seal remains tight. The products, having a lighter weight and a higher modulus of elasticity than the metal salt therein, are useful materials of construction for high temperature applications where such properties in combination with inherent chemical and heat resistant properties of the product's components enable such diverse uses as moldings, linings, barriers, surface layers and the like in the chemical processing and missile arts.

The present invention is based, at least in part, on the discovery that containment during solidification to a plastic condition of a molten fusible metal salt in close association with vitreous reinforcing bodies by the method of the invention provides a product containing a continuous solid mass of sub-microscopic metal salt crystals and that such a product has unusual and useful properties. The process of the invention provides a form of the metal salt in the product in which many characteristics commonly exhibited by metals are found and in which many of the usual metal salt characteristics have diminished or disappeared. For example, the products are more ductile, flexible, and malleable than the constituent salts, and in these properties more closely resemble metals than metal salts.

It is an object of the invention to provide a method for solidification to a plastic conditions of a molten fusible metal salt as a continuous solid mass of sub-microscopic crystals having metal-like characteristics.

It is a further object of the invention to provide a method including containment of a molten fusible metal salt in close association with vitreous reinforcing bodies during solidification of the molten salt to a continuous solid plastic mass of sub-microscopic crystals.

It is still another object of the invention to provide an article consisting essentially of a continuous solid mass of sub-microscopic crystals of at least one plastic fusible salt reinforced with vitreous fibers or flakes.

It is an additional object of the invention to provide an article consisting essentially of a continuous solid mass of sub-microscopic crystals of several plastic fusible metal salts reinforced with vitreous fibers or flakes.

Other objects and advantages will be apparent from the description which follows, which is intended only to illustrate and disclose, and is in no way to be construed as limiting the invention to less than its true spirit and scope.

According to the method of the invention, a molten fusible metal salt is contained in close association with vitreous reinforcing fibers or flakes during solidification of the molten salt to a plastic solid. Through the containment of the salt during solidification there is provided what may be termed a controlled crystal growth of the salt. The containment causes a continuous solid mass of sub-microscopic crystals of the metal salt reinforced with the vitreous bodies. The crystals, so formed, are extremely small, and are not apparent to the naked eye or even apparent under a low-power microscope. Examination by X-ray diffraction has substantiated that the solidified solid mass of the metal salt consists essentially of sub-microscopic crystals. This continuous solid mass of the sub-microscopic crystals exhibits many of the desirable characteristics of metals in that the mass is malleable and capable of plastic deformation. In contrast to the resulting product of the process of the invention in which containment constrains the crystal growth, a process not including containment during solidification results in a product consisting essentially of metal salt crystals of larger than sub-microscopic size. This product of crystals larger than sub-microscopic size has a definite crystalline appearance which is detectable to the naked eye and also under a microscope. This product of larger crystals is a relatively loosely bonded mass, which cleaves upon application of stress thereto, and fails to exhibit substantial plastic deformation characteristics. Such masses of larger crystals possess the usual characteristics of metal salts and in most instances are easily comminuted to a powder.

The method of the invention provides a product consisting essentially of a continuous solid mass of sub-microscopic crystals of at least one plastic fusible metal salt reinforced by a plurality of vitreous reinforcing bodies. Desirably the continuous solid mass consists essentially of sub-microscopic crystals of several compatible plastic fusible metal salts reinforced with vitreous fibers or flakes, as such a product exhibits better flexure characteristics than are obtainable with a single one of the salts reinforced by the vitreous bodies.

For practice of the invention there is used a plastic fusible metal salt. The term "plastic," as used throughout the specification and claims, is intended to connote its usual meaning of capable of plastic deformation. A material which is capable of plastic deformation has an extremely low modulus of elasticity. Plastic, as applied to metal salts, includes those metal salts which are ductile, pliable, and malleable enough to be worked into various shapes without rupture thereof. A number of fusible metal salts, such as silver, thallium and lead chlorides, exhibit a noticeable capability of plastic deformation at normal room temperature (70° F.). Other fusible metal salts exhibit such a capability to a noticeable extent only at temperatures higher than normal room temperature and lower than the melting temperature of the salt. For example, sodium chloride, which melts at about 800° C. (1472° F.), is relatively brittle at extremely low temperatures yet may be deformed plastically at higher than normal room temperature, deformability increasing particularly sharply from about 200° C. (392° F.) to provide stress-strain curves similar to stress-strain curves of metals.

On the other hand, various vitreous fibrous or flake reinforcing materials at temperatures below their softening points are relatively non-plastic and have high moduli of elasticity. When a plastic fusible metal salt is reinforced with such vitreous reinforcing bodies, the resulting composite article is composed of two different materials of substantially different elastic moduli. When the article is subjected to a stress, the metal salt tends to undergo plastic deformation and to exert forces on the reinforcing vitreous bodies. Because of the high modulus of elasticity of the vitreous reinforcing bodies, the reinforcing bodies resist the deformation which such forces tend to cause. However, because of the capability of the metal salt to undergo plastic deformation, the internal stresses are distributed through a substantial number of the reinforcing bodies with the result that the reinforcing bodies provide highly effective reinforcement. In fact, vitreous bodies may reinforce the metal salt to such an extent that substantial deformation of the metal salt is prevented, even by forces which would cause plastic flow of the metal salt, if unreinforced.

Suitable plastic metal salts for practice of the invention are solid materials at normal room temperature and are fusible or by application of heat capable of liquification to a molten state at a temperature below that which is destructive of reinforcing properties of the particular vitreous reinforcing bodies employed for reinforcement. Thus, there exists considerable latitude in the choice of the plastic fusible metal salt for employment in the invention. The major requirements for a suitable metal salt are that the salt have the plastic and fusible characteristics already described. Inorganic metal salts, which are salts of inorganic acids and metals, are particularly useful. Illustrative, but not a complete listing thereof, are the following metal salts: barium nitrate; beryllium iodide; bismuth iodide; cesium bromide; cesium nitrate; cesium disulfide, cupric chloride; cupric sulfate; cuprous arsenide; cuprous bromide, cuprous chloride; cuprous iodide; cuprous sulfide; ferrous iodide; lead acetate; lead bromide; lead chloride; lead iodide; lead chromate; lithium carbonate; lithium chloride; lithium nitrate; lithium sulfate; sodium chloride; silver chloride; strontium bromide; stannous chloride; stannous iodide; stannous selenide; stannous sulfide; strontium nitrate; zinc chloride; zinc iodide and the like.

While for practice of the invention it is prerequisite that the metal salt be both plastic and fusible at a temperature below the softening point of the particular vitreous reinforcing bodies employed for reinforcement the particular requirements of the application in which the product is to be used also are inportant in selection of the most satisfactory salt. Where the product, in service, will be in contact with moisture or water, desirably a non-hygroscopic and substantially water-insoluble plastic fusible metal salt is employed. Similarly where the service will involve contact with various chemicals and materials, desirably a plastic fusible metal salt having a requisite chemical resistance and inertness towards such chemicals and materials is employed. Some salts also provide products of better physical properties than others and when physical properties are an important criteria for the end application, some leeway exists in choice of the most satisfactory salts. Surprisingly, when a mixture of several compatible plastic fusible metal salts is employed, it is possible to obtain a product exhibiting physical properties superior to those obtainable with an individual plastic fusible metal salt reinforced with the vitreous reinforcing bodies. For many applications it is preferred that a mixture of two or more compatible plastic fusible salts be employed for practice of the invention. Particularly useful and preferred are mixtures of two or more salts from the group consisting of silver chloride, lead chloride, and thallium chloride, although other mixtures, such as any or all of these salts with other compatible plastic fusible metal salts, and such as mixtures of any two or more compatible plastic fusible metal salts, are apparent and also are believed to provide superior physical characteristics.

The vitreous reinforcing bodies employed in practice of the invention can be described generically as a plurality of bodies of vitreous material in a physical form in which the material has a high ratio of surface to volume. In such bodies at least one dimension in at least one direction is not greater than about 0.005 inch and this dimension is significantly smaller than at least one other dimension at right angles to the dimension not greater than about 0.005 inch. Thus, the vitreous reinforcing bodies encompass flakes, fibers, and similar shapes. The chemical composition of the fibers, flakes and the like, is relatively unimportant, except that it affects the maximum service temperature to which the vitreous bodies are suited. The plastic metal salt must be fusible below the maximum service temperature of the vitreous bodies. The maximum service temperature of vitreous fibers, flakes and the like, is about the lowest temperature at which the vitreous reinforcing material softens sufficiently to lose its particular physical form and physical properties, such as tensile and reinforcing properties, inherent to that physical form. Numerous vitreous reinforcing bodies are known to the art and are available for employment in the practice of the invention. Particularly useful are glass fibers and flakes which have been leached, coated or modified in some manner to raise the maximum service temperature. Some of these glass bodies have a maximum service temperature as high as 2000° F. (1093° C.). Such bodies of glass are particularly desirable for practice of the invention in that products can be prepared therefrom which are satisfactory for service applications closely approaching the higher maximum service temperatures of such bodies. Illustrative of some glass bodies, which have been modified to raise their maximum service temperature and which may be used in practice of the invention, are: fibers and flakes coated with certain refractory oxides (U.S. Patents 2,793,130 and 2,901,379); "refrasil" fibers and flakes produced by leaching glass bodies with acid solutions at elevated temperatures and then firing such leached glass bodies to produce bodies containing high silica contents; and high silica content bodies coated with a refractory metal oxide or silicate. In addition, other vitreous materials can also be used, such as mineral wool, asbestos, and Fiberfrax (a high temperature ceramic fiber produced by the Carborundum Company). By the term "vitreous reinforcing bodies," as used throughout the specification and claims, it is intended to encompass not only bodies of recognized glass compositions, glass bodies which have been leached, coated, or otherwise modified in some manner to raise their maximum service temperature; but all vitreous particulate materials including those listed above in a physical form in which they have a major dimension that is many times greater than the minor dimension of the particles, and which are relatively non-plastic and have a high modulus of elasticity so as to be capable of forming strong reinforcing filaments or flakes.

Amounts and proportions of plastic fusible metal salt to vitreous reinforcing bodies can vary widely for practice of the invention. An amount of vitreous reinforcing bodies sufficient to provide significant reinforcment of the plastic fusible salt should be employed. An amount of plastic fusible metal salt sufficient to provide plastic deformability and to form a substantially continuous binder phase for the components of the product should be employed. Useful amounts of vitreous reinforcing bodies depend on the amounts of plastic fusible metal salt being employed with the amounts of each depending on the size or sizes of vitreous reinforcing bodies being employed. Reinforcing bodies of particular sizes should be employed in amounts and ratios to the plastic fusible metal salt to provide a close association thereof such that the average distance between adjacent reinforcing bodies is from about 10HT (HT=10$^{-5}$ inch) to about 150HT. Average distance between adjacent reinforcing bodies is a function of the amount by weight or volume of the reinforcing bodies and the size of the reinforcing bodies. For example, in a tubular-shaped product consisting essentially of a plurality of continuous reinforcing fibers uniformly disposed in a parallel arrangement, and extending longitudinally of the product, products of from about ⅓ to 21 percent by volume of 10HT average diameter fibers range in average distance between adjacent fibers from about 10HT to 150HT; products of from about 5 to 58 percent by volume of 50HT average diameter fibers range in average distance between adjacent fibers from about 10HT to 150HT; and products of from about 50 to 80 percent by volume of 500HT average diameter fibers range in average distance between adjacent fibers from about 10HT to 150HT. Thus, for any particular size of reinforcing bodies the useful amounts thereof by volume or weight vary from the useful amounts for a different size of reinforcing bodies. Generally, the larger size bodies require larger amounts to provide the requisite average distance between adjacent bodies. In most instances the minimum amounts of reinforcing bodies range from about ⅓ to 50 percent by volume of the product and the maximum amounts thereof from about 20 to 80 percent by volume. The exact minimum and maximum limits depend on the size of the reinforcing bodies employed. Conversely, in most instances the minimum amounts of plastic fusible salt range from about 80 to 20 percent by volume of the product and the maximum amounts thereof from about 99⅔ to 50 percent by volume, and the exact minimum and maximum limits depend on the size of the reinforcing bodies employed.

It is important in the practice of the invention that the average distance between adjacent vitreous reinforcing bodies be between about 0.00150 and about 0.00010 inch. In the absence of a random-directional distribution of the reinforcing bodies throughout the resulting product, any failure to maintain about the aforementioned average distance limits for the reinforcing bodies results in significant detriment to the properties of the resulting product. For example, in such products, when the average distance is less than 0.00010 inch between adjacent reinforcing bodies a slight force applied to the product in at least one direction readily fractures the same. This may well result because there is insufficient metal salt between the reinforcing bodies to enable plastic deformation. Also, in such products, when the average distance is greater than 0.00150 inch between adjacent reinforcing bodies, a force applied to the product in at least one direction results in plastic deformation closely approximating that of an unreinforced plastic fusible metal salt. This may well result because there is too much metal salt between adjacent reinforcing bodies for substantial reinforcement of the salt by the reinforcing bodies. When the aforestated limited amounts of reinforced bodies and plastic fusible metal salts are employed and the average distance between adjacent reinforcing bodies is within the aforestated limits, the resulting products are adequately reinforced as slight forces in any direction do not fracture the product and forces closely approximating the force which causes a plastic flow of unreinforced metal salt are insufficient to cause noticeable plastic deformation of the product.

Ordinarily it is preferred that the reinforcing bodies be of a physical form having at least one dimension in at least one direction between 10 to 100HT so that a significant improvement is achieved by virtue of the reinforcement. For the same reason it is preferred that the average distance between adjacent reinforcing bodies be from about 0.00120 to about 0.00015 inch. Where optimum properties for the product are required it is desirable and preferred that the reinforcing bodies constitute about 5 to 50 percent by volume and that the average distance between adjacent reinforcing bodies be about 0.0010 to 0.00015 inch. When ultimate properties are desired, a mixture of two or more compatible plastic fusible metal salts is used. In vitreous body reinforced products containing such salt mixtures, each salt should constitute at least 5 percent by weight of the salt mixture.

The method of the invention may be practiced in a number of ways, so long as there is a containment of a molten salt in close association with the vitreous reinforcing bodies during solidification of salt to a plastic condition. One manner in which this may be accomplished is by forcing or flowing a molten metal salt into a vessel containing the vitreous reinforcing bodies so as to obtain close association therewith and then solidifying the salt, while so contained and in close association with the vitreous reinforcing bodies. In this method, mechanically applied forces to inject the molten salt, or environmental, gravitational or both forces which cause the molten salt to flow are used. Particularly useful is an evacuated vessel or container with environmental pressures being used to flow the molten salt into the evacuated container in close association with the vitreous reinforcing bodies. Care should be used in flowing or forcing the molten salt so that the close association with the vitreous reinforcing bodies is realized. Usually this is accomplished by having the reinforcing bodies so packed in the container that little or no movement or displacement thereof occurs when the molten salt associates therewith. Another method by which the containment of the molten salt in close association with the vitreous reinforcing bodies may be realized involves thoroughly mixing vitreous reinforcing bodies with the molten salt and then solidifying the admixture while contained in a vessel or a mold. A particularly useful manner is to coat vitreous reinforcing bodies with the salt and then hot press the coated bodies into a compact mass of a desired shape and cool while the pressing is continued. The heating is to a temperature sufficient to bring the salt coating to a molten state, and the pressure is maintained at least until solidification of the coating. Another method is to mix the vitreous reinforcing bodies and a powdered plastic fusible metal salt and then to hot press and cool in the manner indicated above.

The following examples are presented solely for the purpose of further illustrating and disclosing the invention and are not to be construed as limitations thereon.

EXAMPLE 1

A glass tube about 24" long and having an internal diameter of about ¼" was packed with lengths of glass fibers substantially uniformly disposed in a parallel arrangement and extending longitudinally of the tube. The fibers employed were heat cleaned, electrical grade glass, continuous fibers of from 0.00036" to 0.00040" average diameter. About 15,000 yards of the fibers weighed one pound. One end of the tube was then connected to a vacuum pump and the other end was immersed in a molten plastic fusible metal salt. The vacuum pump was operated to draw a vacuum within the tube, with the result that pressure acting on the molten salt forced the same into the fiber packed tube in close association with the fibers contained therein. When molten salt had been drawn into the tube, the outer surface of the tube was cooled to solidify the molten plastic fusible salt in close association with the glass fibers while both were contained within the tube, and the vacuum pump was discontinued. At this time the end of the tube immersed in the molten salt was removed therefrom; the outer surface of the tube was further cooled to about room temperature; and the tube was fractured to recover the resulting product. The product was found to be a smooth cylindrical rod having a slippery feel and having a metallic ring when struck a sharp blow. The following Table I presents the details and particulars of a number of examples prepared in this manner.

cate solidified without the use of fibers. The material has a metallic ring when struck a sharp blow, and is an excellent gasket material.

*Table I*

| Composition No. | Metal Salt | Glass Fibers | | Density, p.c.f. | Max. p.s.i. | Flexural Strength | |
|---|---|---|---|---|---|---|---|
| | | Percent by Volume | Av. Distance Between Adjacent Fibers (HT) | | | P.E.L.,* p.s.i. | Modulus ($\times 10^{-6}$ p.s.i.) |
| 1 | AgCl | 5.6 | 113 | 316 | 10,500 | 3,700 | 2.4 |
| 2 | AgCl | 10.3 | 70 | 298 | 14,500 | 4,800 | 2.8 |
| 3 | AgCl | 21.5 | 38 | 275 | 25,900 | 6,800 | 2.6 |
| 4 | AgCl | 22 | 36 | | 38,000 | | |
| 5 | AgCl | 40 | 17 | 235 | 32,100 | 10,400 | 4.9 |
| 6 | AgCl | 40.5 | 17 | 234 | 36,200 | 17,100 | 3.8 |
| 7 | AgCl | 41.3 | 16 | 227 | 31,800 | 15,900 | 4.0 |
| 8 | SnCl$_2$ | 40 | 17 | 181 | 22,100 | 11,100 | 4.1 |
| 9 | CuCl | 40 | 17 | 184 | 43,600 | 15,700 | 4.7 |
| 10 | PbCl$_2$ | 40 | 17 | 246 | 26,200 | 18,200 | 5.0 |
| 11 | PbCl$_2$ | 20 | 40 | | 25,000 | | 3.6 |
| 12 | {PbCl$_2$, AgCl ª} | 19 | 43 | | 68,000 | | 3.6 |
| 13 | {PbCl$_2$, AgCl ᵇ} | 19 | 43 | | 59,000 | | 3.7 |

*Proportional Elastic Limit.
ª Mixture 9 parts PbCl$_2$ and 1 part AgCl by weight.
ᵇ Mixture 1 part PbCl$_2$ and 1 part AgCl by weight.

For purposes of comparison, but not in accordance with the invention, the procedure of the preceding example was repeated with AgCl, except that glass fibers were not packed in the glass tube. This product had a density of 352 p.c.f., and a flexural strength of 4,000 p.s.i. Max., 2800 p.s.i. P.E.L., and $1.8 \times 10^6$ p.s.i. modulus.

EXAMPLE 2

A continuous filament of glass of about 0.0004 inch diameter is passed quickly through molten AgCl to provide a filament having about 0.00009 inch coating of fused AgCl thereon. A mass of loose lengths of this silver-chloride coated filament are packed in a container and heated. Just after the mass reaches a temperature sufficient to melt the silver chloride coating, i.e. about 850° F., the loose mass is quickly compacted, and while compacted, cooled below the solidification point of silver chloride, i.e. below about 840° F. The compacting force is such as to yield a dense mass in which the glass fibers are in close association with the molten metal salt coatings thereon, and the cooling of the dense closely associated compacted mass is such that solidification of the metal salt occurs while the salt is contained in close association with the glass fiber lengths.

Correspondingly improved properties can be achieved using the methods of Examples 1 and 2 with other fusible plastic metal salts, including those listed above.

EXAMPLE 3

A mixture of 5 parts by volume of high temperature ceramic fibers [1] having an average diameter of 2.5 microns and a length of ¼ inch to 1½ inches, and 95 parts by volume of powdered aluminum sodium silicate is made. The mixture of powder and fiber is placed in a matched steel die having a cavity 4 inches long, 1 inch wide and 1 inch deep; the die is assembled; and a load of approximately 200 pounds per square inch is applied to the mixture. Thereafter the die is heated to a temperature of 2200° F. to melt the powder, and, when the powder is melted, the force on the die is increased to provide a load of from 1000–1500 p.s.i. on the material in the die cavity. The die is cooled while the load is held thereon until the salt has solidified and the material is thereafter removed from the die.

The material formed has a flexural strength approximately three times greater than aluminum sodium silicate solidified without the use of fibers. The material has a metallic ring when struck a sharp blow, and is an excellent gasket material.

The following Table II gives a list of high melting metallic salts which can be cast around refractory fibers, such as Fiberfrax, or high silica fibers known in the trade as refrasil fibers, in any suitable manner, such as used in Example 3, to give strong, ductile materials having stress-strain curves similar to stress-strain curves of metals. These materials will have sub-microscopic crystals of the salts between the vitreous reinforcing material.

*Table II*

Salt: Melting point, ° F.
Aluminum sodium fluoride (AlF$_3$.3NaF) ___ 1832
Barium fluochloride (BaF$_2$.BaCl$_2$) _____ 1846
Cerous molybdate (Ce$_2$(MoO$_4$)$_3$) _____ 1783
Cesium sulfate (Cs$_2$SO$_4$) _____ 1850
Chromous fluoride (CrF$_2$) _____ 2012
Cuprous arsenide (Cu$_3$As) _____ 1526
Cuprous fluoride (Cu$_2$F$_2$) _____ 1666
Lanthanum chloride (LaCl$_3$) _____ 1665
Lead molybdate (PbMoO$_4$) _____ 1954
Lithium fluoride (LiF) _____ 1598
Lithium sulfate (Li$_2$SO$_4$) _____ 1580
Magnesium antimonide (Mg$_3$Sb$_2$) _____ 1762
Manganese fluoride (MnF$_2$) _____ 1571
Nickel bromide (NiBr$_2$) _____ 1765
Nickel chloride (NiCl$_2$) _____ 1834
Potassium chloride (KCl) _____ 1429
Potassium chromate (K$_2$CrO$_4$) _____ 1787
Potassium fluoride (KF) _____ 1616
Potassium silicate (K$_2$SiO$_3$) _____ 1789
Sodium bromide (NaBr) _____ 1391
Sodium fluoride (NaF) _____ 1818
Zinc fluoride (ZnF$_2$) _____ 1602

It will be apparent that various changes and modifications can be made from the specific details disclosed herein without departing from the true spirit and scope of the attached claims.

What I claim is:
1. A product consisting essentially of a continuous solid mass of fine crystals of a plastic fusible inorganic metal salt, reinforced with a plurality of solid vitreous reinforcing bodies of a fiber or flake physical form having a high ratio of surface to volume and at least one dimension in at least one direction of the fiber or flake being not greater than 0.005 inch, in which the continuous solid mass of said crystals spaces said bodies an average distance of from about 0.0015 to 0.0001 inch between adjacent bodies and in which said fine crystals were obtained by solidification of said salt from a molten state

---

[1] The specific fibers are available from the Carborundum Company under the designation "Fiberfrax," and have the following composition: 51.2% Al$_2$O$_3$, 47.4% SiO$_2$, 0.7% B$_2$O$_3$, and 0.7% Na$_2$O, all by weight.

to a solid state while contained in close association with said bodies.

2. The product of claim 1 in which the solid vitreous reinforcing bodies are of a fiber or flake physical form having at least one dimension in at least one direction of the fiber or flake between 0.0001 to 0.001 inch and in which said average distance is from about 0.0012 to 0.00015 inch.

3. The product of claim 2 in which the vitreous reinforcing bodies are in the physical form of fibers.

4. A product consisting essentially of a continuous solid mass of fine crystals of at least one plastic fusible inorganic metal salt, reinforced with a plurality of solid glass bodies in a fiber or flake physical form having a high ratio of surface to volume and at least one dimension in at least one direction of the fiber or flake being between 0.0001 to 0.001 inch, in which the continuous solid mass substantially fills the spaces therebetween and spaces said bodies an average distance of 0.0015 to 0.0001 inch between adjacent bodies and in which said fine crystals were obtained by cooling said salt from a molten state to a solid state while contained and while within the spaces among said bodies.

5. The product of claim 4 in which the continuous solid mass is of fine crystals of two compatible plastic fusible inorganic metal salts and in which each of said salts constitutes at least 5 percent by weight of said mass.

6. The product of claim 5 in which the glass bodies are in the physical form of fibers.

References Cited by the Examiner
UNITED STATES PATENTS 2,860,058  11/1958  Redfarn _____ 61—205

ALEXANDER WYMAN, *Primary Examiner.*

R. A. FLORES, *Assistant Examiner.*